United States Patent [19]

McIntire et al.

[11] Patent Number: 5,342,464
[45] Date of Patent: Aug. 30, 1994

[54] BONDING OF THERMOPLASTIC COMPOSITE STRUCTURES TO METAL STRUCTURES

[75] Inventors: Allen J. McIntire, Ansonia; Geoffrey C. Davis, Madison, both of Conn.

[73] Assignee: United Technologies Corporation, Hartford, Conn.

[21] Appl. No.: 873,902

[22] Filed: Apr. 24, 1992

[51] Int. Cl.$^5$ .................... F16C 3/00; B65H 81/00
[52] U.S. Cl. ........................ 156/172; 156/187; 156/242; 156/293; 156/309.6; 464/181; 464/182; 464/183
[58] Field of Search ............... 156/172, 171, 187, 293, 156/294, 242, 245, 308.2, 309.6; 464/179–183

[56] References Cited

U.S. PATENT DOCUMENTS

| | | | |
|---|---|---|---|
| 2,372,929 | 4/1945 | Blessing . | |
| 2,715,598 | 8/1955 | Rees et al. . | |
| 2,952,578 | 9/1960 | Carlson, Jr. . | |
| 3,239,403 | 3/1966 | Williams et al. . | |
| 3,553,978 | 1/1971 | Williams | 464/181 |
| 3,592,884 | 7/1971 | Williams | 464/181 |
| 3,864,186 | 2/1975 | Balla et al. . | |
| 3,868,291 | 2/1975 | Benz et al. . | |
| 3,900,360 | 8/1975 | Leatherman . | |
| 3,985,604 | 10/1976 | Balla . | |
| 3,993,529 | 11/1976 | Farkas . | |
| 3,996,402 | 12/1976 | Sindt . | |
| 4,045,272 | 8/1977 | Lombardi . | |
| 4,110,506 | 8/1978 | Cottingham et al. . | |
| 4,173,128 | 11/1979 | Corvelli | 464/183 |
| 4,187,135 | 2/1980 | Yates et al. | 156/294 |
| 4,238,539 | 12/1980 | Yates et al. | 156/173 |
| 4,248,062 | 2/1981 | McLain et al. | 156/173 |
| 4,259,382 | 3/1981 | Schwan | 156/172 X |
| 4,268,338 | 5/1981 | Peterson . | |
| 4,289,557 | 9/1981 | Stanwood et al. | 156/172 |
| 4,313,777 | 2/1982 | Buckley et al. . | |
| 4,416,713 | 11/1983 | Brooks . | |
| 4,421,497 | 12/1983 | Federmann et al. | 464/181 |
| 4,533,589 | 8/1985 | Sewell . | |
| 4,556,439 | 12/1985 | Bannick et al. . | |
| 4,560,428 | 12/1985 | Sherrick et al. . | |
| 4,663,819 | 5/1987 | Traylor | 464/181 |
| 4,704,509 | 11/1987 | Hilmersson et al. . | |
| 4,747,796 | 5/1988 | Iwai et al. | 464/180 |
| 4,908,088 | 3/1990 | Boyd et al. . | |
| 4,957,805 | 9/1990 | Biggs et al. . | |
| 4,963,215 | 10/1990 | Ayers . | |

FOREIGN PATENT DOCUMENTS

| | | |
|---|---|---|
| 179451 | 4/1986 | European Pat. Off. . |
| 2851293 | 5/1979 | Fed. Rep. of Germany ...... 464/181 |
| 2620648 | 3/1989 | France . |
| 1034738 | 7/1966 | United Kingdom . |

OTHER PUBLICATIONS

NASA Tech Brief, Jules Kish, Metal-To-Composite Shaft Spline, Mar. 1992.

*Primary Examiner*—Jeff H. Aftergut
*Attorney, Agent, or Firm*—Terrance J. Radke

[57] ABSTRACT

A method of bonding metallic structures to thermoplastic composite structures is described. Various construction details have been developed which provide a method for producing a bond of sufficient strength to transmit rotational and axial loads between the metallic and thermoplastic composite structures. In one embodiment, the method includes the steps of knurling a mating surface of the metallic structure, coating the mating surface with a thermoplastic material to produce a bonding surface, and consolidating the bonding surface to the thermoplastic composite structure.

6 Claims, 3 Drawing Sheets

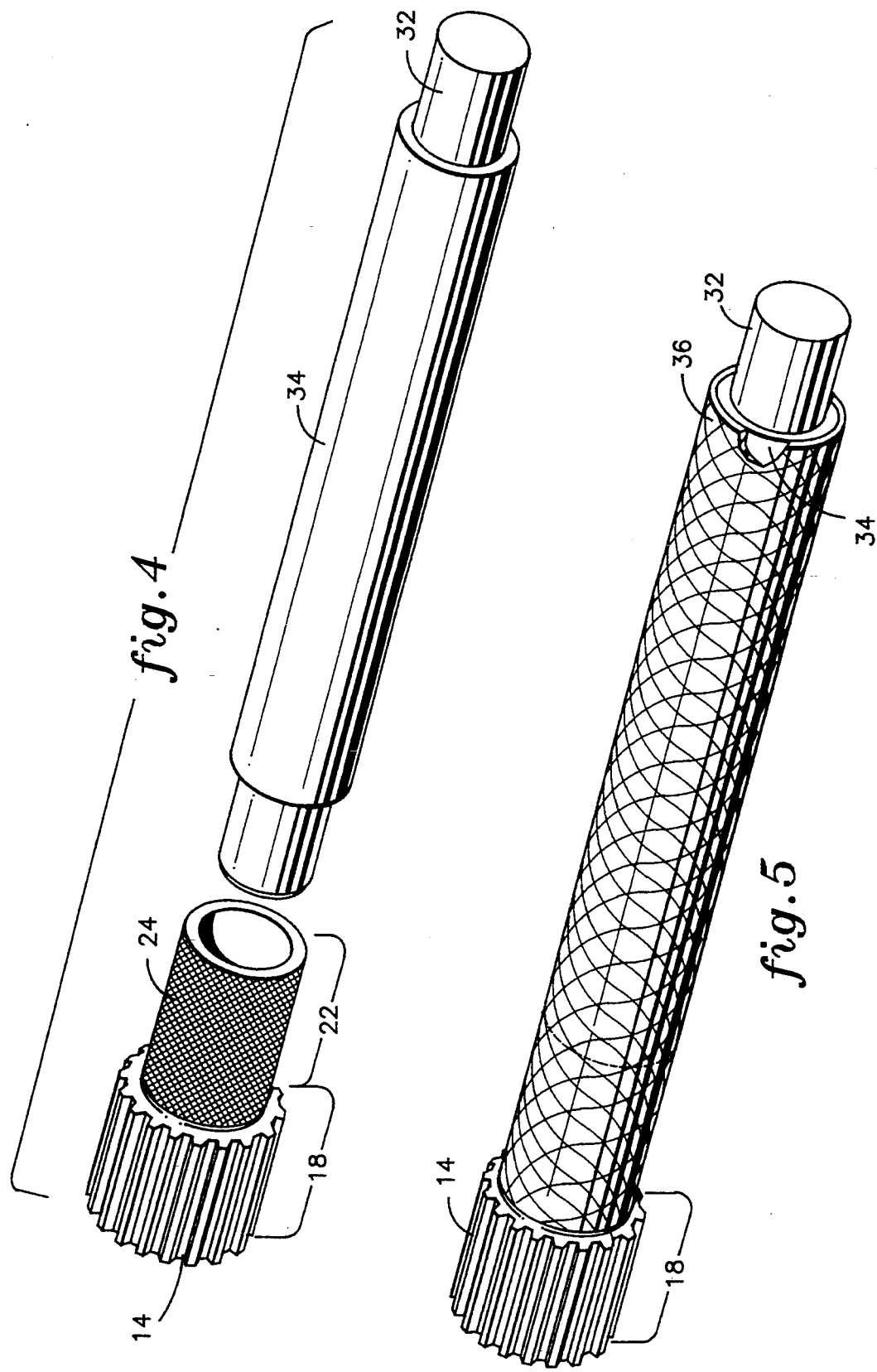

fig.6
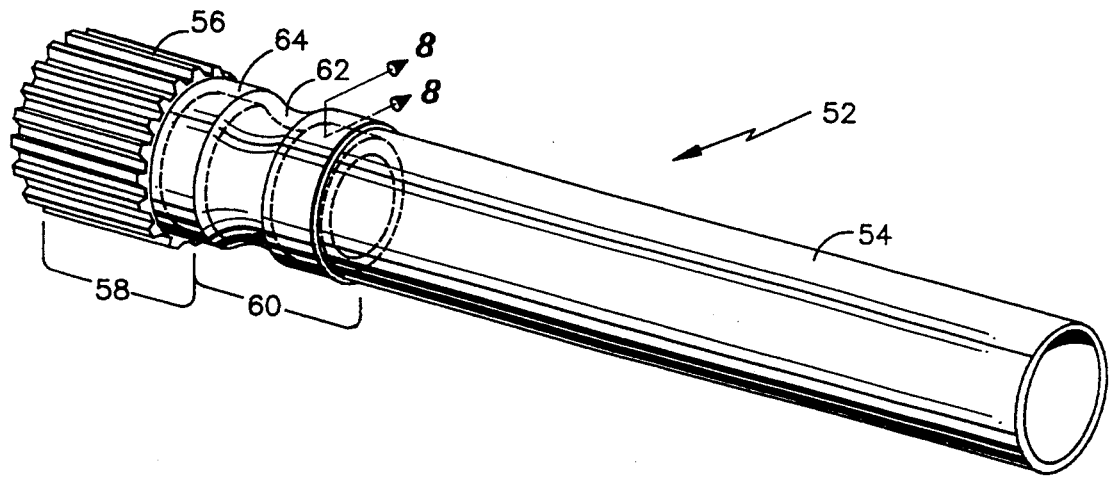
fig.7
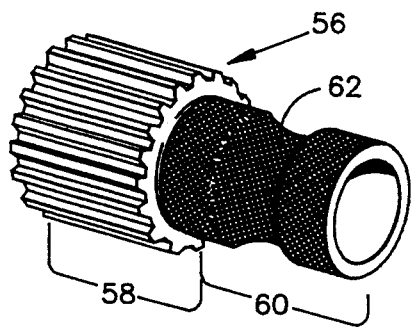
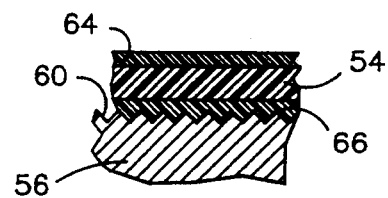
fig.8

BONDING OF THERMOPLASTIC COMPOSITE STRUCTURES TO METAL STRUCTURES

This invention was made under a Government contract and the Government has rights herein.

DESCRIPTION

1. Technical Field

This invention relates to a method for bonding thermoplastic composite structures to metal structures, and more particularly to a thermoplastic to metal bond which will transmit axial and torsional loads between the metal structure and thermoplastic composite structure.

2. Background of the Invention

Thermoplastic composite materials have received widespread use as structural elements. Thermoplastic composite materials produce lightweight structures having relatively high strength characteristics. In addition, these types of materials have the characteristic of being reshapeable because they can be repeatedly heated to the melting temperature of the material. In the aircraft industry, the use of thermoplastic composite materials can produce significant weight savings and provide ease of replacement and repair.

While the uses for structural elements made from thermoplastic composite materials are expanding, in some applications metallic structural members are still preferred. One such application is the splined connection of a rotor shaft to a gas turbine engine of a helicopter. The splined connection fits within a complementary shaped recess and transfers rotational forces from the gas turbine engine to the shaft. Metallic splined connectors are preferred due to the difficulties in forming a composite splined connector of sufficient strength to withstand the engine loads. In this situation, however, the shaft itself could be made from a thermoplastic composite material by attaching a metallic fitting to the end of the shaft. The metallic fitting would connect the shaft to the engine. A second metallic fitting may also be used to connect the shaft to the part being driven, typically a propeller.

A problem in mating thermoplastic composite shafts with metallic fittings is the attachment between the fitting and the shaft. This attachment is required to transfer operational loads, both rotational and longitudinal, between the two items. Thermoplastic composite materials do not fuse with metallic materials with sufficient strength to withstand operational loads. Standard adhesives also do not provide a bond of sufficient strength to withstand the rotational and longitudinal loads required to be transmitted from the fitting to the shaft.

One solution in the prior art is to mechanically connect the fitting to the composite shaft. A connection of this type may use pins and/or flanges adapted to be bolted together. The pinned connections and/or flange portions add to the complexity and the difficulty of fabricating the thermoplastic composite structure. In addition, the mechanical connectors increase the size and weight of the shaft and fitting relative to a simple bonded shaft and fitting. Therefore, it is desirable to avoid or minimize the use of mechanical connectors such as pins and bolted flanges.

The above art notwithstanding, scientists and engineers under the direction of Applicants' Assignee are working to develop methods to bond metallic and thermoplastic composite materials in a manner which will permit the transmission of axial and rotational loads through the bond.

DISCLOSURE OF THE INVENTION

According to the present invention, a method of bonding a metallic structure having a mating surface to a thermoplastic composite structure includes the steps of knurling the mating surface, molding thermoplastic material over the knurled mating surface to produce a bonding surface, laying up laminates of the thermoplastic composite material over the bonding surface, and fusing the bonding surface and the laminates.

According to a particular embodiment of the present invention, the method includes a step of attaching a mandrel to the metallic structure, and wherein the step of laying up the thermoplastic composite material over the bonding surface includes laying up the thermoplastic composite material over the support surface provided by the mandrel. After fusing the thermoplastic composite material and the bonding surface, the mandrel may be removed to produce a hollow thermoplastic composite structure.

According to a further specific embodiment, the mating surface of the metallic element may have a circumferentially recessed portion and the method includes a step of, subsequent to the fusing step, engaging a high tension overwrap with the recessed portion wherein the engagement clamps the fused composite material between the high tension overwrap and the knurled surface.

A principal feature of the present invention is the knurled mating surface of the metallic structure. Another feature is the layer of thermoplastic composite material molded over the knurled surface to form a bonding surface. In one specific embodiment, a feature is the circumferentially recessed portion of the metallic structure. A further feature of this specific embodiment is the high tension overwrap.

A primary advantage of the present invention is the mechanical lock between the metallic structure and the composite structure as a result of the knurled surface being embedded into the composite structure. The knurled surface provides a mechanism to transfer both rotational and longitudinal loads from the metallic structure to the composite structure. Another advantage is the additional mechanical lock in the longitudinal direction as a result of the high tension overwrap and circumferential recess which together clamp the composite structure to the mating surface. A further advantage is the reversibility of the bonding of the metallic structure to the thermoplastic composite structure as a result of the thermoplastic material used in the bond surfaces. The thermoplastic material may be reheated repeatedly to melt the bonding surfaces and remove either the metallic structure or the thermoplastic composite structure.

The foregoing and other objects, features and advantages of the present invention will become more apparent in light of the following detailed description of the exemplary embodiments thereof, as illustrated in the accompanying drawings.

BRIEF DESCRIPTION OF THE DRAWINGS

FIG. 4 is a perspective view of the metallic fitting with a mandrel attached thereto.

FIG. 5 is a perspective view of the metallic fitting subsequent to laying up laminates of thermoplastic composite material over the bonding surface and mandrel.

FIG. 6 is a perspective view of a drive assembly having a metallic fitting bonded to a thermoplastic composite shaft, wherein the drive assembly includes a high tension overwrap clamping the thermoplastic composite shaft to the mating surface.

FIG. 7 is a perspective view of a metallic fitting having a knurled mating surface with a circumferentially recessed portion.

FIG. 8 is a sectioned view taken along line 8—8 of FIG. 6 showing a metallic structure with a layer of thermoplastic material molded over the mating surface and a high tension overwrap.

BEST MODE FOR CARRYING OUT THE INVENTION

Figure 1:
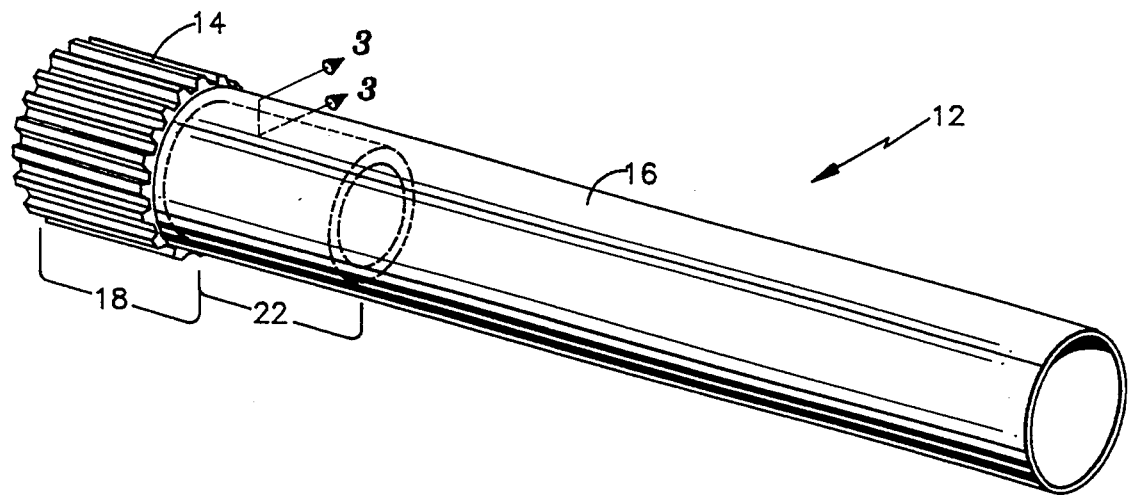
FIG. 1 is a perspective view of a drive assembly having a metallic fitting bonded to a thermoplastic composite shaft.
Figure 2:
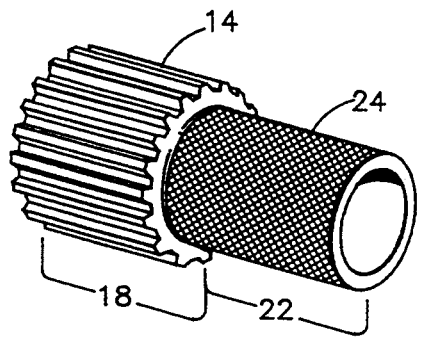
FIG. 2 is a perspective view of the metallic fitting which illustrates a knurled mating surface.

FIG. 1 illustrates a drive assembly 12 including a metallic fitting 14 bonded to a hollow, thermoplastic composite shaft 16. The metallic fitting 14 includes a splined portion 18 and a mating surface 22. The splined portion 18 is adapted to be engaged with a force transmitting element (not shown), such as a gas turbine engine. The mating surface 22 is deeply knurled in a random fashion. The thermoplastic composite shaft 16 is attached to the metallic fitting 14 through a bond between the thermoplastic composite shaft and the mating surface 22 of the metallic fitting 14.

Figure 3:
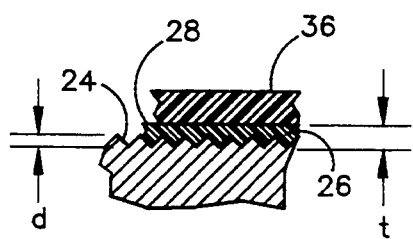
FIG. 3 is a sectioned view taken along line 3—3 of FIG. 1 showing the metallic fitting with a bonding surface formed by molding a layer of thermoplastic material to the knurled mating surface.

The bond, illustrated in FIG. 3, is effectuated by the engagement of the knurls of the mating surface with the thermoplastic composite shaft. The knurls provide a mechanical lock or bite into the thermoplastic composite shaft. The random arrangement of the knurls produces a mechanical lock to both the axial and rotational forces transmitted from the fitting to the thermoplastic composite shaft. Although a random arrangement of knurling is discussed, an oriented configuration of knurls may be used to optimize the load transmission in specific applications.

A method of bonding the thermoplastic composite shaft 16 to the metallic fitting 14 is illustrated in FIGS. 2-5 and comprised of the following steps. First, the mating surface 22 of the metallic fitting 14 is knurled in a conventional manner. The knurling 24 may be random, helical, or a combination of axial and circumferentially directed knurls. The precise pattern and depth d (see FIG. 3) of the knurls 24 depends on the forces to be transmitted between the metallic fitting 14 and the thermoplastic composite shaft 16. In general, a random pattern of knurling is acceptable for typical operational loads. The depth d of the knurls is dependent upon the level of force to be transmitted and the surface area of the knurled mating surface. The greater the surface area, the smaller the depth d may be.

The second step is to mold a layer of thermoplastic material 26 over the mating surface 22. The thermoplastic material selected may be a short fiber reinforced thermoplastic material or an unreinforced thermoplastic material. Reinforced thermoplastic may be required in high load applications. It is suggested that the layer of thermoplastic material 26 be of sufficient thickness t (see FIG. 3) to penetrate into and completely cover the knurls 24 of the mating surface 22. This will provide a bonding surface 28 of thermoplastic material and ensure a mechanical lock exists between the layer of thermoplastic material 26 and the knurled mating surface 22.

The third step is to engage a mandrel 32 with the metallic fitting 14, as shown in FIG. 4. The mandrel 32 provides a support surface 34 for the laying up of laminates of thermoplastic composite material. Although a mandrel is shown in FIG. 4, other means of supporting the laminates during lay-up may be used. In some situations, such as bonding a solid (non-hollow) thermoplastic composite structure to a metallic structure, a means of supporting the lay-ups may not be necessary.

The next step is to lay up the laminates of thermoplastic composite material over the bonding surface 28 and the support surface 34 of the mandrel 32. The lay-ups 36 are repeated until the desired thickness of the thermoplastic composite material is obtained, as shown in FIG. 5. The desired thickness will depend on the application and the specific characteristics of the thermoplastic composite material used.

The final step is to consolidate the lay-ups 36 in a manner suitable for the thermoplastic composite material. As is well known, typically the consolidation will be applying heat and pressure to the lay-ups 36. After consolidation, the mandrel 32 may be removed and the hollow, thermoplastic composite shaft 16 remains bonded to the fitting.

An alternate embodiment and method is illustrated in FIGS. 6-8. In this embodiment, a drive assembly 52 includes a thermoplastic composite shaft 54, a metallic fitting 56 having a splined portion 58, a mating surface 60 with a circumferentially recessed portion 62, and a high tension overwrap 64. The recessed portion 62 is radially offset to provide an additional axial mechanical lock between the metallic fitting 56 and the thermoplastic composite shaft 54. The high tension overwrap 64 provides means to clamp the thermoplastic composite material into the recessed portion 62 and down into the knurled mating surface 60.

The method of bonding the thermoplastic composite shaft 54 to the metallic fitting 56 includes the steps discussed previously for the embodiment illustrated in FIGS. 2-5. In addition, subsequent to the consolidation step which bonds the shaft 54 to a molded layer of thermoplastic material 66, the high tension overwrap 64 is placed around the thermoplastic composite shaft 54 in the vicinity of the recessed portion 62. The high tension overwrap may be formed from a variety of high tensile strength materials. A suggested material is fiberglass.

During operation, the gas turbine engine will transmit rotational loads to the splined portion of the fitting. The rotational loads are then transmitted to the shaft through the engagement between the mating surface and the shaft. Additionally, longitudinal loads may also be transmitted between the shaft and fitting. The bond must be of sufficient strength to transmit both the rotational and longitudinal loads.

Although the invention has been shown and described with respect to exemplary embodiments thereof, it should be understood by those skilled in the art that various changes, omissions and additions may be made therein and thereto, without departing from the spirit and scope of the invention.

We claim:

1. A method for bonding a metallic fitting having a splined portion and a mating surface to a thermoplastic composite shaft to form a drive shaft for transmitting longitudinal and rotational loads of predetermined magnitude, comprising the steps of:

knurling the mating surface of the metallic fitting to form knurls having a predetermined depth dependent upon the predetermined magnitude of the longitudinal and rotational loads to be transmitted by the drive shaft and the surface area of the knurled mating surface;

molding a layer of thermoplastic material having a thickness at least as great as the predetermined depths of the knurls over the knurled mating surface of the metallic fitting to produce a bonding surface overlaying the knurled mating surface;

laying up a plurality of thermoplastic composite laminates over the bonding surface wherein the layed-up thermoplastic composite laminates define the thermoplastic composite shaft; and applying heat and pressure to fuse the layed-up thermoplastic composite laminates to the bonding surface and to form the thermoplastic composite shaft.

2. The method of claim 1 wherein the thermoplastic material molded to the knurled mating surface is an unreinforced thermoplastic material.

3. The method of claim 1 wherein the thermoplastic material molded to the knurled mating surface is a thermoplastic material reinforced with short fibers.

4. The method of claim 1 further comprising the step of engaging a mandrel with the metallic fitting, and wherein the laying up step comprises laying up the thermoplastic composite laminates over the bonding surface and the surface of the mandrel wherein the layed-up thermoplastic composite laminates define the thermoplastic composite shaft.

5. The method of claim 1 further comprising the step of wrapping a high tension overwrap around the thermoplastic composite laminates fused to the bonding surface of the metallic fitting.

6. The method of claim 1 wherein the mating surface has a circumferentially recessed portion and the method further comprises the step of wrapping a high tension overwrap around the thermoplastic composite laminates fused to the circumferentially recessed portion of the bonding surface of the metallic fitting.

* * * * *